July 30, 1940.  J. W. McCAUSLAND  2,209,346
CONTROLLING REACTION TEMPERATURES
Filed May 27, 1937
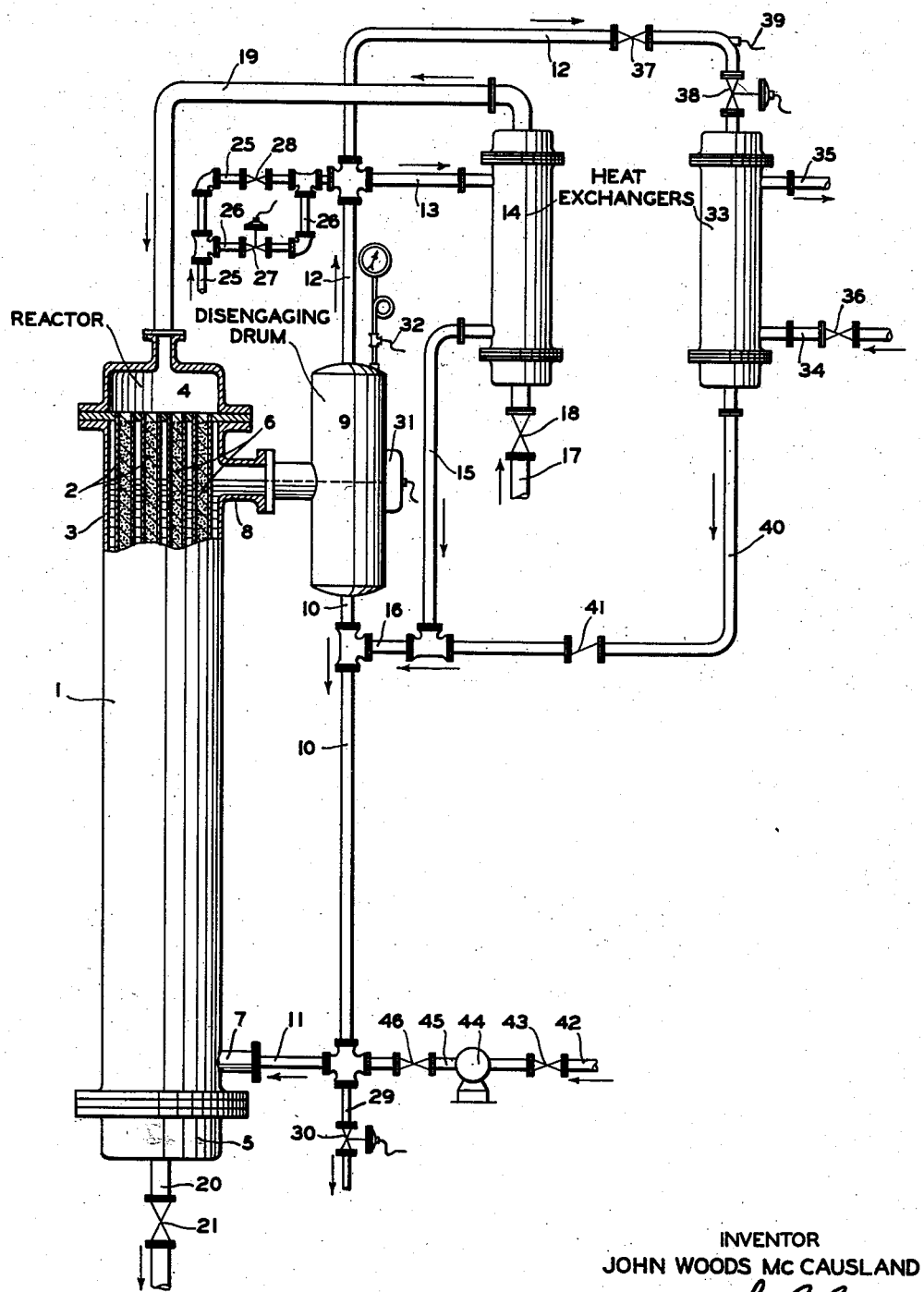
INVENTOR
JOHN WOODS McCAUSLAND
BY
ATTORNEY Patented July 30, 1940

2,209,346

UNITED STATES PATENT OFFICE 2,209,346

CONTROLLING REACTION TEMPERATURES

John Woods McCausland, Chicago, Ill., assignor to Universal Oil Products Company, Chicago, Ill., a corporation of Delaware Application May 27, 1937, Serial No. 144,993

7 Claims. (Cl. 23—288)

This invention is directed primarily to an improved method and means of controlling the temperature of exothermic reactions such as, for example, those involving the catalytic polymerization or catalytic hydrogenation of vaporous, gaseous or liquid hydrocarbons.

In many processes involving catalyzed reactions in which substantial quantities of heat are evolved, the temperature and pressure conditions which must be employed for producing optimum yields of the desired products are critical within fairly close limits and it is therefore desirable to maintain a substantially uniform temperature throughout the reaction zone in order to eliminate zones of high temperature wherein excessive conversion will occur, as well as to eliminate zones of low temperature wherein insufficient conversion will be accomplished. Reactions of this type are usually conducted by passing the material to be reacted, such as hydrocarbons in vaporous, gaseous or liquid state and either alone or together with an extraneous material such as hydrogen or hydrogen-containing gas, for example, through a mass of suitable catalytic material disposed in elongated tubular elements within a reaction zone which is, in effect, a heat exchanger. The cooling medium for controlling the reaction temperature is disposed about the tubular elements of the reactor through the walls of which a substantial portion of the heat of reaction is transferred from the reactants and catalyst mass to the cooling medium.

In systems of this type the best method of maintaining a substantially uniform temperature throughout the reactor is to utilize, as the cooling medium, a normally liquid material of substantially constantly boiling point which is readily vaporizable at substantially the desired reaction temperature. The heat absorbed from the reactants by a cooling medium of this type is primarily latent heat of vaporization and the temperature difference between the cooling medium entering the reactor and leaving the reactor is therefor minimized, the result being a substantially uniform temperature throughout the reaction zone. When the desired temperature is within the range of 220 to 450° F. or thereabouts, water may be economically employed as a cooling medium by maintaining a sufficient superatmospheric pressure thereon to increase its vaporization point to approximately the temperature desired.

In reactions requiring higher temperatures, the cost of pressure equipment for utilizing water will ordinarily be excessive and higher boiling liquids such as, for example, a eutectic mixture of diphenyl and diphenyl oxide, mercury or other high boiling liquid or liquid mixtures, is preferably employed. For reactions requiring temperatures below the normal boiling point of water, subatmospheric pressure may be employed or, preferably, a lower boiling liquid, such as alcohol for example, may be utilized as the cooling medium.

Although the present invention is not so limited, it is primarily concerned with two types of processes, one of which is the catalytic polymerization of normally gaseous olefins such as propene and/or butenes to produce liquid polymers within the boiling range of gasoline, while the other is the catalytic hydrogenation of normally liquid olefins such as iso-octene for the production therefrom of iso-octane. The optimum temperatures for each of these reactions are within the limits, above mentioned, which make the use of vaporizing water, at superatmospheric pressure, desirable as a cooling medium. Therefore, in order to simplify the further explanation of the process, the cooling medium is referred to as water or steam, although it should be understood that the advantageous features of the invention are applicable in processes utilizing other cooling media.

The invention provides for utilizing heat contained in the water vapor or steam removed from the reactor of the system to preheat the material to be treated prior to the introduction of the latter into the catalyst zone. This is accomplished by passing the water vapor or steam in indirect heat exchange with the material to be treated and the condensed water together with any water removed from the reactor in liquid state is returned to the reactor for further use as cooling material. Since the heat evolved by the exothermic reaction may vary with variations in the charging stock and with catalysts possessing different degrees of activity, as well as other factors of the operation, there may either be an excess or a deficiency of heat in the vaporized cooling medium to effect the desired preheating of the charging stock. It seldom if ever happens in practice that the heat made available by the exothermic reaction exactly balances the heat required for preheating the charging stock, although this is theoretically possible.

The present invention provides for supplying any required amount of additional heat to the preheating step of the system by introducing steam from an external source into the stream of steam or water vapor passing from the reactor to the preheating zone, the excess of water resulting from condensation of the additional steam being removed from the system subsequent to the preheating and condensing step and prior to the cooling and vaporization step. The introduction of additional steam is preferably automatically controlled through a regulating valve in the steam line which is responsive to variations in the pressure which it is desired to maintain within the system, whereby the valve automatically opens to admit steam as the pressure falls below a predetermined minimum and automatically closes to diminish or prevent the further admission of steam as the desired pressure is re-established. This automatic feature plus removal from the system of the excess of water resulting from condensation of the additional steam admitted function to control the reaction temperature, through control of the pressure, and to maintain an overall heat balance within the system.

In case the quantity of heat contained in the heated cooling medium which is available for preheating the charging stock is in excess of that required, the present invention provides for supplying only the required quantity of this material to the preheating step and diverting the remainder to a separate cooling and condensing zone, condensed water from both the preheating and said separate condensing zone being returned to the reactor. Preferably, in order to insure that the proper quantity of water vapor or steam is supplied to the preheating zone, an automatic control valve responsive to variation in the pressure within the system is disposed in the water vapor or steam line leading to said separate condenser, whereby the valve opens to admit regulated quantities of said water vapor or steam to the latter zone as the pressure within the system exceeds a predetermined maximum and whereby the valve closes to diminish or prevent the further diversion of said steam or water vapor as the desired lower pressure is approached. Condensation of said water vapor or steam in the separate condensing zone may be accomplished by indirect heat exchange with a suitable cooling medium, such as water, and circulation of this cooling medium may be controlled by an automatically or a manually controlled valve of any desired type. Manual control is ordinarily satisfactory for this purpose but when desired an automatic valve responsive to the pressure within the system, so that as the valve admitting steam to said separate condenser is opened, the valve admitting the cooling medium to the same zone is also opened a corresponding amount and vice versa.

The accompanying diagrammatic drawing illustrates one specific form of apparatus embodying the features of the invention and in which the process of the invention may be conducted, regardless of whether maintenance of the over-all heat balance within the system requires the addition or the extraction of heat.

Referring to the drawing, reactor 1, as here illustrated, is a tubular heat exchanger containing a plurality of elongated tubular elements 2 disposed within shell 3 which comprises the main body of the reactor. Opposite ends of the tubular elements 2 communicate with header compartments 4 and 5 disposed at opposite ends of the reactor. The catalytic material to be employed is disposed within the tubular elements as indicated at 6 and the heat transfer fluid which functions as a cooling medium in the reactor is disposed within the space surrounding the tubular elements.

The cooling medium is admitted to the reactor through an inlet connection 7 in the lower portion of the reactor and is totally or partially vaporized by the heat which it absorbs from the materials undergoing reaction within the tubular elements.

The heated and vaporized heat transfer medium is removed from the upper portion of the reactor either totally in vaporous state or in vaporous and liquid state through outlet connection 8 and passes, in the particular case here illustrated, to a disengaging drum 9 wherein its vaporous and liquid components are separated. Any desired level may be maintained in the disengaging drum or in line 10 which communicates with the reactor through line 11 and inlet connection 7, thereby maintaining a corresponding liquid level in the reactor. The vaporous components of the heat transfer medium withdrawn from reactor 1, such as water vapor and/or steam, are removed from disengaging drum 9 through line 12 and may be directed therefrom, all or in part, through line 13 to a suitable heat exchanger 14 wherein they are condensed and wherefrom the condensate, such as water, is returned through lines 15, 16 and 10 to the body of liquid cooling medium maintained within the system and communicating with reactor 1.

The material to be subjected to the exothermic catalytic reaction is supplied from any suitable source, preferably under pressure and in either vaporous, gaseous or liquid state or in mixed phase, through line 17 and valve 18 to heat exchanger 14 wherein it is preheated to a temperature as close as practical to the desired reaction temperature by indirect heat exchange with the condensing steam or other vaporous heat transfer medium supplied to this zone as previously described. The preheated charging stock is directed from heat exchanger 14 through line 19 to header compartment 4 of reactor 1 and passes downwardly therefrom through the tubular elements 2 in intimate contact with the catalytic material disposed therein. Due to the exothermic nature of the reaction, the temperature of the charging stock increases by contact with the catalyst but the temperature is prevented from substantially exceeding the temperature of the cooling medium by indirect heat exchange thereto. The resulting reaction products pass from the tubular elements to header compartment 5 wherefrom they are directed through line 20 and valve 21 to fractionating and condensing equipment, not illustrated, and/or to any other succeeding portions of the system not pertinent to the present invention.

The system so far described will function satisfactorily only when the heat balance within the system is inherently perfect (i. e., when the heat contained in the vaporous heat transfer medium removed from reactor 1, minus the heat loss therefrom by radiation, etc., and the heat remaining in the condensate resulting from cooling of these vapors in heat exchanger 14, is the same as that required for preheating the charging stock to the desired reaction temperature). Obviously this condition is only a theoretical possibility and seldom, if ever, occurs in practice. Ordinarily, in reactions of the type with which the invention is primarily concerned, such as the catalytic polymerization of normally gaseous olefins or the catalytic hydrogenation of liquid olefins, there will be a slight deficiency of heat generated within the system, but I have found that in practice a change in the nature of the charging stock, such as, for example, a change in the proportion of its readily polymerized and unpolymerizable components, or even a change in the atmospheric conditions, may change the process as a whole from a heat-absorbing to a heat-liberating system and vice versa. The present invention therefore provides for automatically compensating for any excess or deficiency of heat within the system, said means being responsive to variations in the pressure prevailing within that portion of the system through which the heat transfer medium is passed and serving to prevent excessive pressure fluctuations and thereby maintain a substantially uniform and constant temperature in the reactor.

The invention therefore provides three specific methods of operation which may be designated respectively as methods A, B and C, and each of which may be conducted in an apparatus such as herein illustrated.

Method A is utilized when there is a definite deficiency of available heat in the vaporized heat transfer (cooling) medium removed from the reactor as compared to that required to preheat the charging stock to the desired reaction temperature. This method comprises supplying additional heat to the system from an external source by the introduction of additional quantities of the same material employed as the heat transfer medium this material being supplied to the system in heated vaporous state. This material may comprise, for example, live steam at the desired pressure from any suitable steam generating system, not illustrated, and is usually readily available in oil refineries and the like wherein processes of the type above mentioned are utilized.

In the particular case here illustrated, steam may be introduced from line 25 through line 26, control valve 27 and line 13 into heat exchanger 14, together with steam from drum 9, wherein it is condensed and thereby supplies the required additional heat to the charging stock passing through this zone.

Preferably the quantity of additional steam admitted to the system is automatically controlled by valve 27 which is actuated by variations in the pressure of that portion of the system through which the heat transfer medium is passed, a suitable connection 32 being provided in the case here illustrated on disengaging drum 9, this connection communicating through a suitable pressure controller of any well known form, not illustrated, with valve 27. The operation of the control mechanism is such that valve 27 is opened by a drop in pressure in the disengaging drum and is closed when the desired pressure is re-established. Preferably the control mechanism also varies the opening through valve 27 in response to variations in the pressure between the predetermined minimum and maximum pressures so that the pressure is maintained constant within fairly close limits.

The excess water resulting from condensation of the additional steam thus supplied to the system may be removed therefrom through line 29, which communicates with the body of liquid maintained in reactor 1, and preferably removal of the excess water is automatically controlled by control valve 30 disposed in line 29, valve 30 being actuated, in the case here illustrated, by variation of the liquid level in disengaging drum 9 through a suitable liquid level controller 31 communicating with valve 30.

Method B is employed when there is a definite excess of available heat in the vaporized heat transfer medium removed from the reactor over that required to preheat the charging stock to the desired reaction temperature and involves the use of a separate condenser or heat exchanger 33 through which a suitable cooling medium, such as water for example, is recirculated by means of lines 34, 35 and valve 36. Regulated quantities of the hot vaporous heat transfer medium removed from reactor 1, representing the excess over that required to preheat the charging stock, are supplied to condenser 33 through valves 37 and 38 in line 12. Valve 37 may be a hand-controlled block valve, which may be closed when it is not desired to utilize heat exchanger 33, and valve 38 is preferably a pressure actuated valve, the operation of which is controlled through any suitable form of pressure controller, not illustrated, which communicates with this valve and with connection 39 in line 12, or, when desired, connection 32 on disengaging drum 9 may be utilized or the connection may be disposed at any other desired point in the system. The operation of the control mechanism is such that valve 38 opens as the pressure in disengaging drum 9 and communicating portions of the system increases and closes as the pressure decreases and, since additional condensation in condenser 33 serves to reduce the pressure and vice versa, excessive fluctuations in the pressure are thereby obviated and the temperature in the reactor is maintained substantially constant and uniform.

Water formed by condensation of the steam admitted to heat exchanger 33 may be removed from this zone and returned through line 40, valve 41 and the communicating lines to main body of liquid cooling medium maintained within the system. Valve 41 may be a check valve, as here indicated, or may be a hand-controlled block valve or, when desired, this valve and/or valve 37 in line 12 may be omitted.

It will be noted that when method B is employed, the cooling, vaporizing, preheating and condensing cycle of the system is entirely self-contained and except for any minor quantities of the heat transfer medium lost by leakage, neither steam nor water need be added to or removed from the system.

Method C is a cooperative combination of methods A and B and is preferably employed when the heat contained in the vaporized cooling medium, minus the heat lost by radiation, etc., is substantially the same as that required for preheating the charging stock to the desired reaction temperature and when, due to changes in the quantity or composition of the charging stock and/or atmospheric conditions, etc., the over-all heat balance may vary from endothermic to exothermic and vice versa during the operation. In accordance with this embodiment of the process a predetermined quantity of additional steam, in excess of that required to maintain a perfect heat balance during periods of the operation in which there is a deficiency of heat generated within the system, is continuously admitted to the system. This is preferably accomplished by opening a manually operated control valve 28 in line 24 a predetermined amount, valve 27 in line 26 being closed and bypassed. The quantity of steam thus admitted to the system will therefore be substantially constant and the amount of excess steam over that required to preheat the charging stock to the desired temperature may vary during the operation. This excess quantity of steam is automatically diverted from heat exchanger 14 to heat exchanger 33 through valve 38, which functions in the same manner as above described in connection with method B and serves as the automatic control means for the system.

The excess water condensed from the steam in exchangers 14 and 33 is released from the system through valve 30 in line 29 which, as previously described in connection with method B, is preferably actuated by variations in the liquid level maintained in reactor 1. The remaining water, representing the quantity required for the desired cooling in reactor 1 is supplied thereto in the manner previously described.

Preferably, in an apparatus of the type illustrated and above described, the elevation of heat exchangers 14 and 33 is sufficiently above the desired liquid level in reactor 1 to effect return of the condensed cooling medium to the main body thereof in and communicating with the reactor by gravity, thus obviating the use of a pump. The system herein provided is particularly well suited to this method of returning cooling medium to the reactor since minor variations in the liquid level in this zone will not appreciably affect the operation of the process and controlled positive circulation of the cooling medium is unnecessary.

Although the invention definitely contemplates the use of any of the three methods of operation above described, method C has been found the most satisfactory and practical in most of the catalytic polymerization and catalytic hydrogenation processes in which the features of the invention have so far been utilized, since it requires a minimum of attention by the operator, regardless of pronounced changes in atmospheric conditions, as well as changes in the characteristics of the charging stock, and maintains a uniform reaction temperature within fairly close limits under all conditions. However, with other types of reactions and/or with a housed apparatus or in localities not subject to pronounced changes in atmospheric conditions and with charging stock of fairly uniform characteristics, either method A or method B may be found more satisfactory.

It will be apparent from the foregoing that all three embodiments of the process are necessary to obtain the best practical application of the invention and to obtain the beneficial results of these features over the wide range of conditions to which they are adaptable. Furthermore, in accordance with method C, above described, features of methods A and B are utilized in a cooperative and interdependent manner.

In starting the operation of the process, water for example or any other desired liquid cooling medium, preferably of substantially constant boiling point, may be supplied from any suitable source through line 42 and valve 43 to pump 44 by means of which it is supplied at the desired pressure through line 45, valve 46, line 11 and inlet connection 7 to the lower portion of the reactor. As an alternative, the cooling medium may be supplied to the system in heated vaporous state through line 25 and valve 28 or through valve 27 in line 26 and is preferably directed through line 13 to heat exchanger 33, wherein it is condensed, the condensate being supplied therefrom through line 40, valve 41, lines 10, 11 and inlet connection 7 to the reactor until the desired liquid level and pressure is obtained, following which the system may be operated in accordance with any of the three methods above described. The latter method of starting the operation is preferable in case water is to be employed as the cooling medium and distilled water is not readily available.

It will, of course, be understood that many modifications of the specific form of apparatus herein illustrated and above described, may be utilized without departing from some or all of the advantageous novel features of the invention. For example, either counter-current or concurrent flow may be employed in the reactor between the cooling medium and the fluid undergoing treatment. It is also permissible to eliminate the disengaging drum, in which case the heat transfer medium from reactor 1 may be supplied directly to heat exchanger 14 in either vaporous state or mixed phase. Preferably, however, the heat transfer medium supplied to condenser 33 is supplied thereto in vaporous state, since automatic control valves of the type indicated at 38 will ordinarily function more efficiently on vapors rather than on materials in mixed phase. These and many other modifications and departures from the apparatus illustrated and the specific embodiments of the process described will be readily apparent to a skilled operator or mechanic are therefore not illustrated but may be employed within the scope of the invention to meet specific conditions.

Although not indicated in the drawing, reactor 1, disengaging drum 9 (when employed), heat exchanger 14 and the communicating lines are preferably insulated, to conserve heat and minimize temperature fluctuations due to changes in atmospheric conditions, except in operations wherein a definite and substantial amount of excess heat is generated within the system.

As another specific method of operation which may be utilized as a modification of either methods B or C, above described, heat exchanger 33 may be omitted, in which case excess steam from line 12 may be exhausted from the system through valve 38, by well known means not shown. In such cases pump 44 may be operated continuously or intermittently, to maintain the desired liquid level in the reactor.

As an example of specific operation conditions which may be employed in a process devoted to the catalytic polymerization of normally gaseous olefins and utilizing the features of the invention in an apparatus such as illustrated and above described. The charging stock consists principally of a mixture of butane and butenes and has a gravity of approximately 110° A. P. I. This material is supplied to heat exchanger 14, from an oil cracking system wherein it is produced, at a temperature of approximately 100° F. and is preheated in this heat exchanger to a temperature of approximately 295° F. at a superatmospheric pressure of approximately 630 pounds per square inch. This preheating is accomplished by indirect heat exchange between the charging stock and condensing steam from the disengaging drum.

In this operation two reactors similar to that illustrated at 1 in the drawing are utilized in series, the heated gases entering the first reactor and passing down through the tubular elements thereof in contact with a precalcined catalyst comprising a mixture of ortho- and para-phosphoric acids on a silicious adsorbent material such as diatomaceous earth, acid treated clay or the like. The partially polymerized products are transferred from the lower portion of the first reactor to the upper portion of the second reactor through which they are passed downwardly in contact with the same type of catalyst, the reaction products being removed from the lower portion of the second reactor to suitable separating and fractionating equipment. Due to pressure drop through the catalyst beds the pressure of the products leaving the second reactor is approximately 550 pounds per square inch, superatmospheric.

In this particular operation it is desirable to maintain a reaction temperature not substantially in excess of 310° F. Therefore, a superatmospheric pressure of approximately 50 pounds per square inch is maintained in that portion of the system through which the heat transfer medium is passed. Distilled water is employed as the heat transfer medium and under the pressure mentioned is vaporized in the reactors at a temperature of approximately 300° F. The temperature of the materials undergoing reaction is thereby limited to approximately 310° F. and a substantially uniform temperature is maintained throughout the length of each of the reactors.

The disengaging drum communicates with the upper portion of the space surrounding the catalyst containing tubes of both of the reactors and steam generated by the exothermic reaction is supplied to the disengaging drum.

The mode of operation above referred to as "method C" is employed in this particular case. A predetermined quantity of steam, in excess of that required to compensate for any deficiency of heat generated within the system is continuously commingled with the steam discharged from the disengaging drum and the water resulting from condensation of the additional steam is automatically removed from the system by the operation of a liquid level controller. The remaining portion of the water condensed into heat exchangers 14 and 33 is returned to the reactors by gravity and the quantity of steam diverted to heat exchanger 33 is automatically controlled by valve 38 and varies with fluctuations in the pressure maintained in that portion of the system through which the heat transfer medium is passed so as to maintain a fairly constant pressure in this portion of the system and thereby maintain a substantially uniform temperature in the reactors.

I claim as my invention:

1. In a process wherein a reactant is subjected to exothermic reaction while in indirect heat exchange relation with a normally liquid cooling medium which is vaporized by the heat of the reaction and vapors of said medium passed in indirect heat exchange with said reactant prior to supplying the latter to the reaction, the method of preheating the reactant in the second-mentioned heat exchange step to a temperature approaching that of said reaction which comprises automatically controlling the amount of said vapors supplied to said second-mentioned heat exchange in response to variations in the pressure generated by the vaporization of the liquid medium as a result of the first-mentioned heat exchange, increased amounts of the vapors being supplied in response to decreases in pressure and diminished amounts thereof being supplied in response to increases in pressure.

2. In a process wherein a reactant is subjected to exothermic reaction while in indirect heat exchange relation with a normally liquid cooling medium which is vaporized by the heat of the reaction, the vapors thus formed being insufficient to preheat said reactant to the desired reaction temperature, the method which comprises adding to said vapors, from an external source, a sufficient quantity of said medium in vaporous state to form a mixture capable of preheating said reactant to a temperature approaching that of said reaction, automatically controlling the amount of said vaporous medium added to said vapors from the external source in response to variations in the pressure generated by the vaporization of the liquid medium as a result of said indirect heat exchange, increased amounts of the added vaporous medium being supplied in response to decreases in pressure and diminished amounts thereof being supplied in response to increases in pressure, and passing the mixture of said vapors and added vaporous medium in indirect heat exchange with said reactant prior to supplying the latter to the reaction.

3. In a process wherein a reactant is subjected to exothermic reaction while in indirect heat exchange relation with a normally liquid cooling medium which is vaporized by the heat of the reaction, the vapors thus formed being insufficient to preheat said reactant to the desired reaction temperature, the method which comprises adding to said vapors, from an external source, a sufficient quantity of said medium in vaporous state to form a mixture capable of preheating said reactant to a temperature approaching that of said reaction, automatically controlling the amount of said vaporous medium added to said vapors from the external source in response to variations in the pressure generated by the vaporization of the liquid medium as a result of said indirect heat exchange, increased amounts of the added vaporous medium being supplied in response to decreases in pressure and diminished amounts thereof being supplied in response to increases in pressure, passing the mixture of said vapors and added vaporous medium in indirect heat exchange with said reactant prior to supplying the latter to the reaction, condensing said mixture to a liquid, removing from the process a quantity of said liquid corresponding substantially to the amount of said medium added from the external source, and introducing the remaining portion of said liquid into indirect heat exchange relation with the reactant undergoing said exothermic reaction.

4. In a process wherein a reactant is subjected to exothermic reaction while in indirect heat exchange relation with a normally liquid cooling medium which is vaporized by the heat of the reaction, the vapors thus formed being more than is required to preheat said reactant to the desired reaction temperature, the method which comprises passing the reactant, prior to supplying the same to the reaction, in indirect heat exchange with only such an amount of said vapors as will preheat the reactant to a temperature approaching that of the reaction, the remainder of said vapors being automatically diverted from the last-named heat exchange step in response to variations in the pressure generated by the vaporization of the liquid medium as a result of the first-mentioned heat exchange, increased amounts of said vapors being diverted from the heat exchange with the reactant in response to pressure increases and diminished amounts thereof in response to decreases in pressure.

5. In a process wherein a reactant is subjected to exothermic reaction while in indirect heat exchange relation with a normally liquid cooling medium which is vaporized by the heat of the reaction, the vapors thus formed being more than is required to preheat said reactant to the desired reaction temperature, the method which comprises passing the reactant, prior to supplying the same to the reaction, in indirect heat exchange with only such an amount of said vapors as will preheat the reactant to a temperature approaching that of the reaction, the remainder of said vapors being automatically diverted from the last-named heat exchange step in response to variations in the pressure generated by the vaporization of the liquid medium as a result of the first-mentioned heat exchange, increased amounts of said vapors being diverted from the heat exchange with the reactant in response to pressure increases and diminished amounts thereof in response to decreases in pressure, condensing said remainder of the vapors and returning the resultant condensate and the condensate formed from the vapors passed in heat exchange with the reactant into indirect heat exchange relation with the reactant undergoing said exothermic reaction.

6. In a process wherein a reactant is subjected to exothermic reaction while in indirect heat exchange relation with a normally liquid cooling medium which is vaporized by the heat of the reaction, the method which comprises continuously adding to the vapors of said medium a substantially constant amount of extraneous vaporized normally liquid cooling medium, passing in indirect heat exchange with said reactant, prior to supplying the latter to said reaction, a sufficient quantity of the admixed vapors to preheat the reactant to a temperature approaching that of the reaction, the remainder of said vapors being automatically diverted from the last-named heat exchange step in response to variations in the pressure generated by the vaporization of the liquid medium as a result of the first-mentioned heat exchange, increased amounts of said vapors being diverted from the heat exchange with the reactant in response to pressure increases and diminished amounts thereof in response to decreases in pressure.

7. In a process wherein a reactant is subjected to exothermic reaction while in indirect heat exchange relation with a normally liquid cooling medium which is vaporized by the heat of the reaction, the method which comprises continuously adding to the vapors of said medium a substantially constant amount of extraneous vaporized normally liquid cooling medium, passing in indirect heat exchange with said reactant, prior to supplying the latter to said reaction, a sufficient quantity of the admixed vapors to preheat the reactant to a temperature approaching that of the reaction, the remainder of said vapors being controllably diverted from the last-named heat exchange step in response to variations in the pressure generated by the vaporization of the liquid medium as a result of the first-mentioned heat exchange, increased amounts of said vapors being diverted from the heat exchange with the reactant in response to pressure increases and diminished amounts thereof in response to decreases in pressure, condensing the vapors passed in heat exchange with the reactant and said remainder of the vapors, continuously withdrawing from the process a quantity of the condensed vapors corresponding substantially to said extraneous medium, and introducing the remaining portion of the condensed vapors into indirect heat exchange relation with the reactant undergoing said exothermic reaction.

JOHN WOODS McCAUSLAND.